US012641475B2

(12) United States Patent
Han

(10) Patent No.: US 12,641,475 B2
(45) Date of Patent: May 26, 2026

(54) TRANSMISSION METHOD, TERMINAL DEVICE, AND STORAGE MEDIUM

(71) Applicant: SPREADTRUM COMMUNICATIONS (SHANGHAI) CO., LTD., Shanghai (CN)

(72) Inventor: Lifeng Han, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 343 days.

(21) Appl. No.: 18/264,647

(22) PCT Filed: Jan. 29, 2022

(86) PCT No.: PCT/CN2022/074941
§ 371 (c)(1),
(2) Date: Aug. 8, 2023

(87) PCT Pub. No.: WO2022/171028
PCT Pub. Date: Aug. 18, 2022

(65) Prior Publication Data
US 2024/0056873 A1     Feb. 15, 2024

(30) Foreign Application Priority Data
Feb. 9, 2021     (CN) .......................... 202110182894.0

(51) Int. Cl.
*H04W 28/02*          (2009.01)
(52) U.S. Cl.
CPC ... *H04W 28/0268* (2013.01); *H04W 28/0278* (2013.01)

(58) Field of Classification Search
None
See application file for complete search history.

(56) References Cited

U.S. PATENT DOCUMENTS

| 2009/0327844 | A1* | 12/2009 | Suneya | .................. H04L 1/1835 |
| | | | | 714/776 |
| 2011/0128952 | A1* | 6/2011 | Kim | ...................... H04L 47/828 |
| | | | | 370/347 |

(Continued)

FOREIGN PATENT DOCUMENTS

| CN | 1518278 A | 8/2004 |
| CN | 102547848 A | 7/2012 |

(Continued)

OTHER PUBLICATIONS

Samsung, S2-2000887,"Modification of PDU Session to Always-on PDU Session for URLLC QoS Flow", 3GPP tsg_salwg2_arch, Jan. 7, 2020.

(Continued)

*Primary Examiner* — Andre Tacdiran
(74) *Attorney, Agent, or Firm* — HAUPTMAN HAM, LLP

(57)          ABSTRACT

A transmission method, a terminal device, and a storage medium are provided. The method includes: transmitting multiple quality of service (QoS) flows to a first network device according to synchronization group information, or receiving the multiple QoS flows from the first network device according to the synchronization group information. The synchronization group information indicates synchronous transmission and/or reception of the multiple QoS flows.

18 Claims, 7 Drawing Sheets

(56)     References Cited

U.S. PATENT DOCUMENTS

| | | | | |
|---|---|---|---|---|
| 2015/0229465 | A1 | 8/2015 | De Foy et al. | |
| 2017/0289047 | A1 | 10/2017 | Szilagyi et al. | |
| 2019/0190635 | A1* | 6/2019 | Goel | H04W 56/001 |
| 2020/0178145 | A1 | 6/2020 | Han et al. | |
| 2022/0095161 | A1* | 3/2022 | Kim | H04W 12/033 |
| 2023/0067851 | A1* | 3/2023 | Zeng | H04W 28/0268 |
| 2023/0379747 | A1* | 11/2023 | Paris | H04W 28/0263 |

FOREIGN PATENT DOCUMENTS

| | | | |
|---|---|---|---|
| CN | 106797651 | * | 5/2017 |
| CN | 111357318 | A | 6/2020 |
| CN | 111757511 | A | 10/2020 |
| DE | 112018007743 | * | 3/2022 |
| IN | 201917003246 | A | 7/2019 |
| IN | 201917033204 | A | 9/2019 |
| WO | 2020036928 | A1 | 2/2020 |
| WO | 2020199397 | A1 | 10/2020 |

OTHER PUBLICATIONS

WIPO, International Search Report and Written Opinion for International Application No. PCT/CN2022/074941, May 7, 2022.

The extended European search report issued in corresponding EP application No. 22752189.5 dated Jun. 11, 2024.

Chao Zhou et al., "Research on the remotetariff electric energy metering scheme based on object-oriented electric data exchange protocol" Electrical Measurement & Instrumentation vol. 55 No. 15A. Aug. 8, 2018.

Thales (Moderator) "[POST112-e][150][NTN] Stage 2 running CR (Thales)" 3GPP TSG-RAN WG2 Meeting #113-e R2-2102252, dated Jan. 25-Feb. 5, 2021.

First Office Action issued in corresponding CN application No. 202110182894.0 dated Jan. 13, 2025.

Second Office Action issued in corresponding CN application No. 202110182894.0 dated Aug. 7, 2025.

* cited by examiner

TRANSMISSION METHOD, TERMINAL DEVICE, AND STORAGE MEDIUM

CROSS-REFERENCE TO RELATED APPLICATION(S)

This application is a National Stage of International Application No. PCT/CN2022/074941, field Jan. 29, 2022, which claims priority to Chinese Patent Application No. 202110182894.0, filed Feb. 9, 2021, the disclosures of which are hereby incorporated by reference in their entirety.

TECHNICAL FIELD

The present disclosure relates to the field of communication technologies, and more particularly, to a transmission method, a terminal device, and a storage medium.

BACKGROUND

Multi-modality services (also referred to as multi-modal services) may include multiple data flows, where the multiple data flows have different quality of service (QoS) requirements. For example, the data flows may be videos, such as video media and audio media, data obtained by sensors, such as brightness, temperature, and humidity, tactile data, such as pressure, vibration, temperature, gravity, pull forces, etc. For one multi-modality service, how to realize synchronous transmission of multiple data flows in a communication network is a current problem to-be-solved.

SUMMARY

In a first aspect, a transmission method is provided. The method is applicable to a terminal device and includes: transmitting multiple quality of service (QoS) flows to a first network device according to synchronization group information, or receiving the multiple QoS flows from the first network device according to the synchronization group information. The synchronization group information indicates synchronous transmission and/or reception of the multiple QoS flows.

In a second aspect, a terminal device is provided. The terminal device includes a transceiver, a memory configured to store one or more programs, and a processor configured to execute the one or more programs to cause the transceiver to: transmit multiple QoS flows to a first network device according to synchronization group information, or receive the multiple QoS flows from the first network device according to the synchronization group information. The synchronization group information indicates synchronous transmission and/or reception of the multiple QoS flows.

In a third aspect, a non-transitory computer-readable storage medium is provided. The computer-readable storage medium stores computer programs used for electronic data interchange. The computer programs are operable with a computer to transmit multiple QoS flows to a first network device according to synchronization group information, or receive the multiple QoS flows from the first network device according to the synchronization group information. The synchronization group information indicates synchronous transmission and/or reception of the multiple QoS flows.

BRIEF DESCRIPTION OF THE DRAWINGS

In order to describe technical solutions in implementations of the disclosure more clearly, the following will give a brief introduction to accompanying drawings required for describing implementations. Apparently, the accompanying drawings hereinafter described illustrate some implementations of the disclosure. Based on these drawings, those of ordinary skills in the art can also obtain other drawings without creative effort.

DETAILED DESCRIPTION

Figure 1:
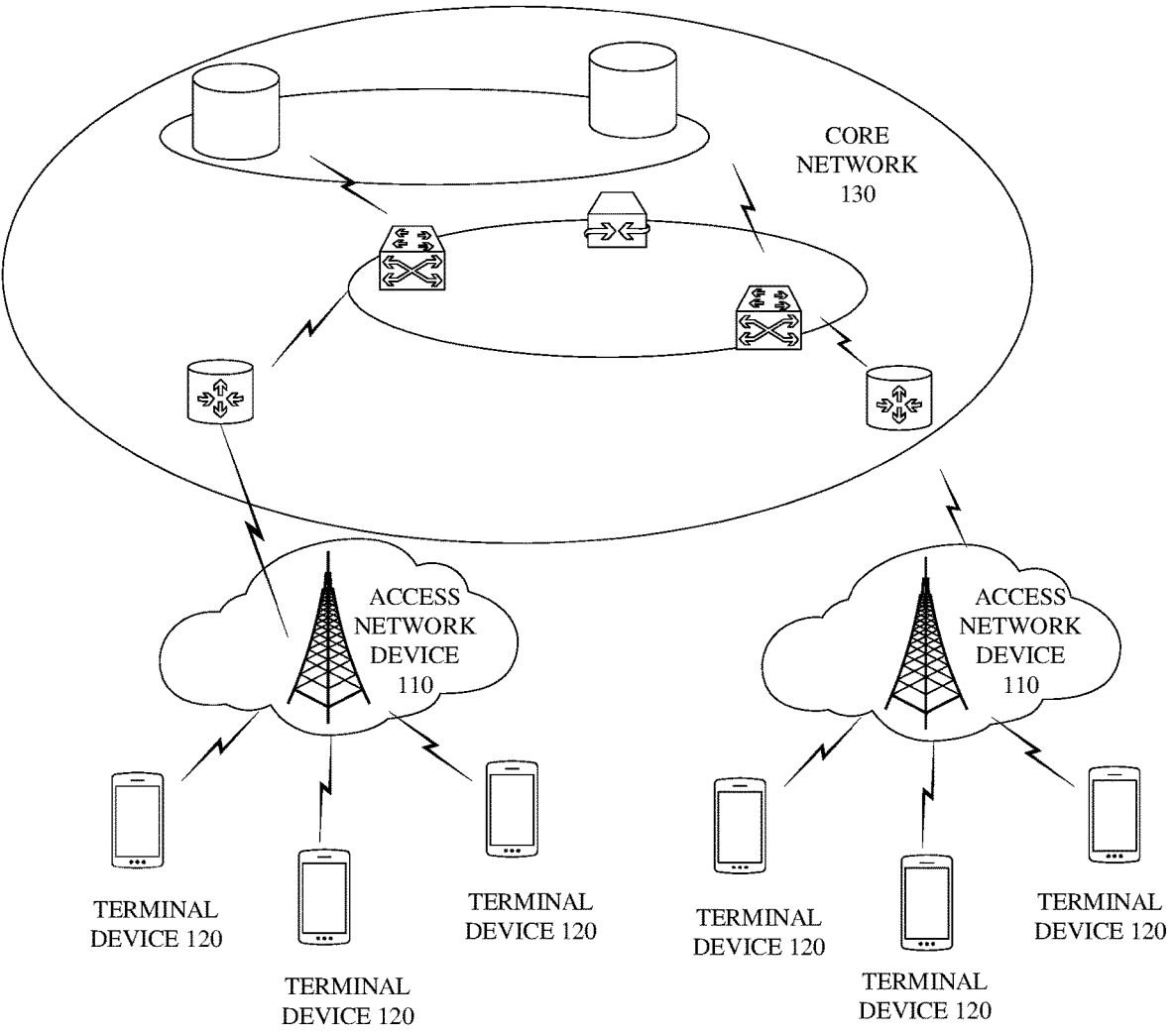
FIG. 1 is a schematic diagram illustrating an architecture of a communication system provided in implementations of the disclosure.

First of all, some terms involved in implementations of the disclosure are explained to facilitate understanding by those skilled in the art.

1. Terminal device. The terminal device in implementations of the disclosure is a device with a wireless communication function, and may be referred to as a terminal, a user equipment (UE), a mobile station (MS), a mobile terminal (MT), an access terminal device, a vehicle-mounted terminal device, an industrial-control terminal device, a UE unit, a UE station, a mobile station, a remote station, a remote terminal device, a mobile device, a UE terminal device, a wireless communication device, a UE agent, a UE apparatus, or the like. The terminal device may be fixed or mobile. It should be noted that the terminal device may support at least one wireless communication technology, for example, long term evolution (LTE), new radio (NR), wideband code division multiple access (WCDMA), and the like. For example, the terminal device may be a mobile phone, a pad, a desktop computer, a notebook computer, an all-in-one computer, a vehicle-mounted terminal, a virtual reality (VR) terminal device, an augmented reality (AR) terminal device, a wireless terminal in industrial control, a wireless terminal in self driving, a wireless terminal in remote medical surgery, a wireless terminal in smart grid, a wireless terminal in transportation safety, a wireless terminal in smart city, a wireless terminal in smart home, a cellular phone, a cordless phone, a session initiation protocol (SIP) phone, a wireless local loop (WLL) station, a personal digital assistant (PDA), a device with a wireless communication function such as a handheld device, a computing device, or another processing device connected to a wireless modem, a wearable device, a terminal device in a future mobile communication network or a future evolved public land mobile network (PLMN). In some implementations of the disclosure, the terminal device may also be an apparatus with a transceiving function, for example, a chip system. The chip system may include a chip and may also include other discrete components.

2. Access network device. The access network device in implementations of the disclosure is a device that provides a wireless communication function for a terminal device, and may also be referred to as a radio access network (RAN) device, an access network element, or the like. The access network device may support at least one wireless communication technology, such as LTE and NR. Exemplarily, the access network device includes, but is not limited to, a next generation node B (gNB), an evolved node B (eNB), a radio network controller (RNC), a node B (NB), a base station controller (BSC), a base transceiver station (BTS), a home base station (e.g., a home evolved node B, home node B, HNB), a baseband unit (BBU), a transmitting and receiving point (TRP), a transmitting point (TP), a mobile switching center, or the like in a 5th-generation (5G) mobile communication system. The network device may also be a radio controller, a centralized unit (CU), and/or a distributed unit (DU) in a cloud radio access network (CRAN) scenario, or the access network device may be a relay station, an access point, a vehicle-mounted device, a terminal device, a wearable device, an access network device in future mobile communications, an access network device in a future evolved PLMN, or the like. In some implementations, the access network device may also be an apparatus that provides a wireless communication function for a terminal device, such as a chip system. For example, the chip system may include a chip and may also include other discrete components.

In some implementations, the access network device can also communicate with an internet protocol (IP) network, such as the internet, a private IP network, or other data networks.

3. Core network. The core network in implementations of the disclosure consists of core network elements. The core network elements may also be referred to as core network devices, and are network elements deployed in a core network, such as core-network control-plane network elements or core-network user-plane network elements. The core network in implementations of the disclosure may be an evolved packet core (EPC) or a 5G core network, and may also be a new core network in a future communication system. For example, the 5G core network consists of a set of network elements, such as an access and mobility management function (AMF) implementing mobility management and other functions, a user plane function (UPF) providing functions such as data packet routing and forwarding and quality of service (QoS) management, and a session management function (SMF) providing functions such as session management, IP address allocation and management. The EPC may consist of a mobility management entity (MME) providing functions such as mobility management and gateway selection, a serving gateway (S-GW) providing functions such as data packet forwarding, and a PDN gateway (P-GW) providing functions such as terminal address allocation and rate control. For a multicast broadcast service (MBS), the core network may include several new network elements to implement functions such as data packet forwarding, MBS conference management, QoS management, transmission mode switching (switching between unicast and multicast/broadcast transmission modes). Another manner is that the functions may be implemented by an existing core network element.

4. Uplink communication. The uplink communication in implementations of the disclosure can also be referred to as uplink transmission, and refers to unidirectional communication from a terminal device to an access network device. A communication link for uplink communication is an uplink. Data transmitted on the uplink is uplink data, and a transmission direction of the uplink data is an uplink direction.

5. Downlink communication. The downlink communication in implementations of the disclosure can also be referred to as downlink transmission, and refers to unidirectional communication from an access network device to a terminal device. A communication link for downlink communication is an downlink. Data transmitted on the downlink is downlink data, and a transmission direction of the downlink data is a downlink direction.

6. Transmission resource. The transmission resource includes a frequency-domain resource and a time-domain resource. The transmission resource is used for transmission of data in a communication system. A data radio bearer (DRB) refers to a radio bearer in wireless communication and is used for transmission of one or more QoS flows. A transmission resource corresponding to a DRB may be dynamically scheduled by a network side, i.e., each data transmission is performed on a transmission resource indicated by a network. The transmission resource corresponding to the DRB may also be statically configured by the network side, i.e., the transmission resource corresponding to the DRB may be a periodic transmission resource pre-configured by the network side, and data carried in the DRB is transmitted on the corresponding transmission resource. An interval between different transmission resources in the time domain specifically refers to an interval between ends of different transmission resource blocks constituting the different transmission resources in the time domain, that is, a time interval between transmission resources. For example, transmission resource 1 consists of multiple transmission resource blocks 1, and transmission resource 2 consists of multiple transmission resource blocks 2. Certain transmission resource block 1 and corresponding transmission resource block 2 are used for synchronous transmission of data packets of a multi-modality service, an interval between an end of the transmission resource block 1 and an end of the transmission resource block 2 is a time interval between transmission resources. The transmission resource block 1 is used for transmission of data packet 1 and data packet 2 of QoS flow 1 of multi-modality service 1, and the corresponding transmission resource block 2 is used for transmission of data packet 3 and data packet 4 of QoS flow 2 of the multi-modality service 1. The data packet 1, the data packet 2, the data packet 3, and the data packet 4 need to be transmitted synchronously.

7. QoS flow. The QoS flows in implementations of the disclosure refer to data flows having the same QoS requirement. For example, a service may include multiple QoS flows, and one of the multiple QoS flows may include one or more data flows, where the data flows may be IP data flows or non-IP data flows.

8. Multi-modality service. The multi-modality service in implementations of the disclosure includes various QoS flows, where multiple QoS flows have different QoS. Data of different QoS flows may be generated from different sources, for example, from different data collectors or sensors. A certain interrelation exists between different QoS flows in a multi-modality service, for example, these different QoS flows need to be transmitted synchronously and have different priorities. Exemplarily, a multi-modality service includes multiple QoS flows, and one multi-modality service may belong to the same session, where the session refers to a connection between a terminal and a core-network user-plane network element, and the session may be a protocol data unit (PDU) session, a multicast broadcast service (MBS) session, and other types of sessions.

9. The term "at least one" involved in implementations of the disclosure refers to one or more, and the term "a plurality of" or "multiple" refers to two or more. The term "and/or" describes an association relationship between associated objects indicating that three relationships can exist, for example, A and/or B, which can indicate the existence of A alone, A and B together, and B alone, where A and B may be singular or plural. The character "/" in this disclosure generally indicates that associated objects are in an "or" relationship. The expression "at least one of" or equivalents thereof refers to any combination of the terms, including any combination of singular terms (pieces) or plural terms (pieces). For example, at least one of a, b, or c can represent: a, b, c, a and b, a and c, b and c, or a, b, and c, where each of a, b, and c may be an element per se, and may also be a set of one or more elements.

Furthermore, unless otherwise stated, ordinal numerals such as "first" and "second" mentioned in implementations of the disclosure is for distinguishing multiple objects and is not intended to limit the order, timing, priority, or importance of multiple objects. For example, the first and second information are only used to distinguish different information, rather than indicate difference in content, priority, transmitting order, or importance of the two information.

The term "connection (coupling)" used in implementations of the disclosure refers to various connection (coupling) manners such as direct or indirect connection (coupling) to achieve communication between devices, which is not limited in implementations of the disclosure.

The following describes implementations of the disclosure with reference to accompanying drawings in implementations of the disclosure.

Technical solutions in implementations of the disclosure are applicable to a global system for mobile communication (CSM), a code division multiple access (CDMA) system, a wideband code division multiple access (WCDMA) system, a worldwide interoperability for microwave access (Wi-MAX) system, an LTE system, a 5G communication system (such as NR), a communication system integrating multiple communication technologies (such as a communication system integrating LTE technology and NR technology), or are applicable to various future new communication systems, such as a 6-th generation (6G) communication system, a 7-th generation (7G) communication system, etc., which is not limited in implementations of the disclosure. The technical solutions in implementations of the disclosure are applicable to different network architectures including, but not limited to, a relay network architecture, a dual-connectivity (DC) architecture, a vehicle-to-everything (V2X) communication architecture, etc.

Exemplarily, FIG. 1 is a schematic diagram illustrating an architecture of a communication system provided in implementations of the disclosure. As illustrated in FIG. 1, the communications system includes an access network device 110 and a terminal device 120. In some implementations, the communication system may further include a core network 130, where the core network 130 is connected to the access network device 110.

It should be noted that the communication system illustrated in FIG. 1 is only used as an example for description, and is not intended to limit implementations of the disclosure. For example, forms and the number (quantity) of the access network device, the terminal device, and the like are not limited in implementation of the disclosure.

A transmission method provided in implementations of the disclosure is described with reference to the communication system illustrated in FIG. 1.

Figure 2:
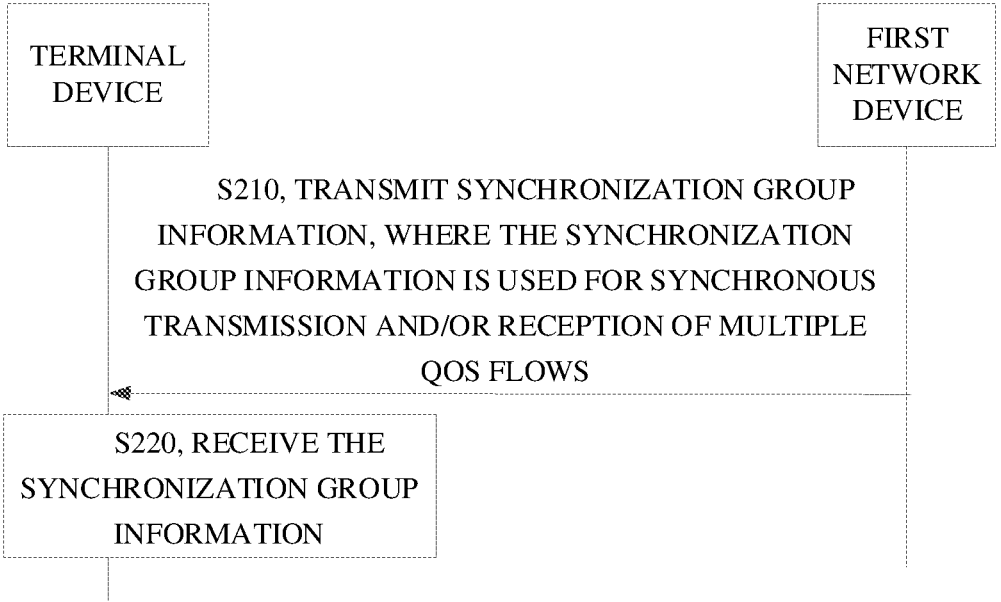
FIG. 2 is a schematic flowchart illustrating a transmission method provided in implementations of the disclosure.

For example, FIG. 2 is a schematic flowchart illustrating a transmission method provided in implementations of the disclosure. The method specifically includes the following.

S210, a first network device transmits synchronization group information to a terminal device, where the synchronization group information is used for synchronous transmission and/or reception of multiple QoS flows.

The first network device can carry synchronization group information of a multi-modality service in a first message and transmit the first message to the terminal device, where the multi-modality service includes multiple QoS flows. The first message may be a radio resource control (RRC) message, for example, RRC reconfiguration, RRC setup, RRC resume, RRC reestablishment, and the like.

In implementations of the disclosure, the synchronization group information of the multi-modality service is introduced, so that the first network device can configure air interface transmission and schedule air interface resources according to the synchronization group information, thereby increasing a possibility of synchronous transmission of the multiple QoS flows.

In some implementations of the disclosure, the synchronization group information includes at least one of: a synchronization time granularity, a primary QoS flow indicator, or a synchronization group identifier. The synchronization time granularity indicates a maximum transmission interval of synchronous transmission between different QoS flows in a synchronous transmission group. The primary QoS flow indicator indicates a primary QoS flow among the multiple QoS flows, and the primary QoS flow is a reference QoS flow for transmission time interval (TTI) calculation in the synchronous transmission group.

During data transmission, one multi-modality service may be divided into one or more synchronous transmission groups, and each synchronous transmission group may include a group of multiple QoS flows need to be transmitted synchronously. Each synchronous transmission group may be represented by a synchronization group identifier, and the terminal device and/or the first network device can obtain a synchronous transmission group to-be-transmitted and/or a synchronous transmission group to-be-received according to the synchronization group identifier. The synchronization group identifier may be a synchronization group ID, an application (APP) ID, and so on.

Exemplarily, the synchronization group information includes a synchronization time granularity of a synchronous transmission group, and the synchronization time granularity may refer to a maximum transmission interval of synchronous transmission between different QoS flows in the same synchronous transmission group. That is, on condition that a transmission interval between different QoS flows is less than or equal to the synchronization time granularity, it may be considered that the different QoS flows are transmitted synchronously. The synchronization transmission granularity may be 1 ms, 5 ms, or 10 ms. For example, in the case where a terminal and an access network device have data packet 1 and data packet 2 of QoS flow 1 to-be-transmitted, a transmission time difference between the data packet 1 and the data packet 2 needs to be less than or equal to the synchronization time granularity.

Exemplarily, the synchronization group information further includes the primary QoS flow indicator. The primary QoS flow indicator indicates a primary QoS flow in a synchronous transmission group, where the primary QoS flow refers to a QoS flow taking the synchronization time granularity as a transmission time reference. That is, a transmission time difference between another QoS flow and the primary QoS flow is calculated based on a transmission time of the primary QoS flow, to determine whether the QoS flows satisfy a requirement of synchronous transmission. For example, in the case where the terminal and the access network device have the data packet 1 and the data packet 2 of the QoS flow 1 to-be-transmitted, where the QoS flow 1 is the primary QoS flow, a transmission time difference of the data packet 2 is calculated based on a transmission time of the data packet 1. At a transmitting end, a time when a data packet starts to be transmitted or a time when the data packet is transmitted successfully is taken as a transmission time, to calculate a transmission time difference between different QoS flows. At a receiving end, a time when a data packet is received successfully is taken as a transmission time, to calculate a transmission time difference between different QoS flows.

S220, the terminal device receives the synchronization group information from the first network device.

Furthermore, in some implementations, in response to reception of the first message, the terminal device can transmit, according to the synchronization group information in the first message, the multiple QoS flows in the synchronous transmission group and/or receive the multiple QoS flows transmitted by the network device, so that the multiple QoS flows satisfy the requirement of synchronous transmission, thereby ensuring air-interface synchronous transmission.

Accordingly, in implementations of the disclosure, the first network device can transmit the synchronization group information to the terminal device, so that synchronous transmission and/or synchronous reception of different QoS flows of the multi-modality service may be realized according to the synchronization group information, thereby ensuring air-interface synchronous transmission.

In a possible implementation, the synchronization group information may be transmitted from a core-network control-plane network element to the first network device. Exemplarily, the first network device receives a second message from the core-network control-plane network element, and then transmits the first message to the terminal device, where the second message includes the synchronization group information of the multi-modality service.

For example, the second message may be a message that is transmitted from the core-network control-plane network element to the first network device during session establishment and modification, UE context establishment and modification, or cell handover between the first network device and the core-network control-plane network element. The second message may be, for example, a PDU SESSION RESOURCE SETUP REQUEST, a PDU SESSION

8

RESOURCE MODIFY REQUEST, an INITIAL CONTEXT SETUP REQUEST, a UE CONTEXT MODIFICATION REQUEST, a HANDOVER REQUEST, MBS SESSION RESOURCE SETUP REQUEST, an MBS SESSION RESOURCE MODIFY REQUEST, etc.

For example, in implementations of the disclosure, the core-network control-plane network element may include an access and mobility management function (AMF), a session management function (SMF), and a policy control function (PCF), and other network elements.

In other implementations of the disclosure, the core-network control-plane network element may further configure the synchronization group information for multiple QoS flows for uplink transmission and/or multiple QoS flows for downlink transmission. Specifically, for some multi-modality services for uplink transmission, such as data obtained by a sensor and tactile data, the core-network control-plane network element may configure the synchronization group information for multiple QoS flows for uplink transmission. For some multi-modality services for downlink transmission, such as audio and video downloading, the core-network control-plane network element may configure the synchronization group information for multiple QoS flows for downlink transmission. For some multi-modality services that require interaction, such as video calls and voice calls, the core-network control-plane network element may configure the synchronization group information for multiple QoS flows for downlink transmission and downlink transmission.

Specifically, the core-network control-plane network element can configure synchronization group information of a multi-modality service, and transmit the synchronization group information to the first network device. The first network device can transmit the synchronization group information to the terminal device through the first message in response to reception of the synchronization group information of multiple QoS flows from the core-network control-plane network element.

In a possible implementation, the synchronization group information in the first message is configured according to a DRB or a logical channel (LCH), that is, the synchronization group information of the multi-modality service is configured through the DRB or the LCH. Specifically, at least one of a synchronization time granularity between different DRBs or LCHs, a primary DRB/LCH indicator, or a synchronization group identifier is configured.

In a possible implementation, the first message includes a non-access stratum (NAS) message, and the synchronization group information is carried in the NAS message.

After the synchronization group information of the multi-modality service is configured by the core-network control-plane network element, the synchronization group information can be directly transmitted to the terminal device (forwarded by a base station). Therefore, the core-network control-plane network element transmits the NAS message to the first network device, where the NAS message includes the synchronization group information, that is, the synchronization group information is carried in the NAS message. After the first network device receives the NAS message, the first network device may carry the NAS message in the first message to forward the synchronization group information to the terminal device.

In a possible implementation, the method further includes transmitting the synchronization group information to a second network device. The second network device is a network device that receives a handover request transmitted by the first network device.

During handover of the terminal, the first network device (a source base station) can carry the synchronization group information in a third message and transmit the third message to the second network device (a target base station), in response to reception of the synchronization group information transmitted by the core-network control-plane network element. As such, after the terminal device hands over to the second network device, the second network device can configure air interface transmission and schedule air interface resources according to the synchronization group information, thereby ensuring air-interface synchronous transmission.

The third message may be a HANDOVER REQUEST message, where the HANDOVER REQUEST message is a handover request message transmitted to the second network device from the first network device for the first network device to request that a terminal connected to the first network device hands over to the second network device.

Furthermore, after the second network device receives the HANDOVER REQUEST message carrying the synchronization group information, the second network device may also determine, according to the synchronization group information, whether to confirm the handover request (handover decision). For example, the second network device can reject the handover request on condition that the second network device fails to satisfy a synchronous transmission requirement of a synchronous transmission group corresponding to the synchronization group information. The second network device can confirm the handover request on condition that other conditions are satisfied and the second network device satisfies the synchronous transmission requirement of the synchronous transmission group corresponding to the synchronization group information. Furthermore, the second network device can transmit the first message to the terminal device, where the first message includes the synchronization group information.

In a possible implementation, transmitting the synchronization group information includes: receiving the synchronization group information from a third network device, and transmitting the synchronization group information to the second network device. The third network device is a network device that transmits a handover request to the first network device.

During handover of the terminal, the third network device (a source base station) can carry the synchronization group information in the third message and transmit the third message to the first network device (a relay base station), in response to reception of the synchronization group information transmitted by the core-network control-plane network element. The first network device forwards the synchronization group information to the second network device (a target base station), so that after the terminal device hands over to the second network device, the second network device can configure air interface transmission and schedule air interface resources according to the synchronization group information, thereby ensuring air-interface synchronous transmission.

In a possible implementation, the first network device is an access network device that establishes a control-plane connection with the core-network control-plane network element.

The method further includes transmitting the synchronization group information to a fourth network device. The fourth network device is a network device that has established a/no connection with the terminal device and has established no control-plane connection with the core-network control-plane network element.

In a DC scenario, the first network device transmits the third message to the fourth network device, where the third message is used for the first network device to request the fourth network device to establish a connection with the terminal. That is, the terminal device establishes a connection with both the first network device and the fourth network device. The third message is also used for the first network device to request modification of an existing connection between the fourth network device and the terminal.

The first network device can carry the synchronization group information in the third message and transmit the third message to the fourth network device in response to reception of the synchronization group information transmitted by the core-network control-plane network element, so that the fourth network device can configure air interface transmission and schedule air interface resources according to the synchronization group information. The third message may be an S-NODE ADDITION REQUEST, an S-NODE MODIFICATION REQUEST, an S-NODE CHANGE CONFIRM message, or the like.

Furthermore, the second network device can transmit the first message to the terminal device, where the first message includes the synchronization group information.

In implementations of the disclosure, the first network device notifies other network devices (the second network device and/or the fourth network device) or the terminal device of the synchronization group information of the multi-modality service, which can ensure air-interface synchronous transmission.

Figure 3:
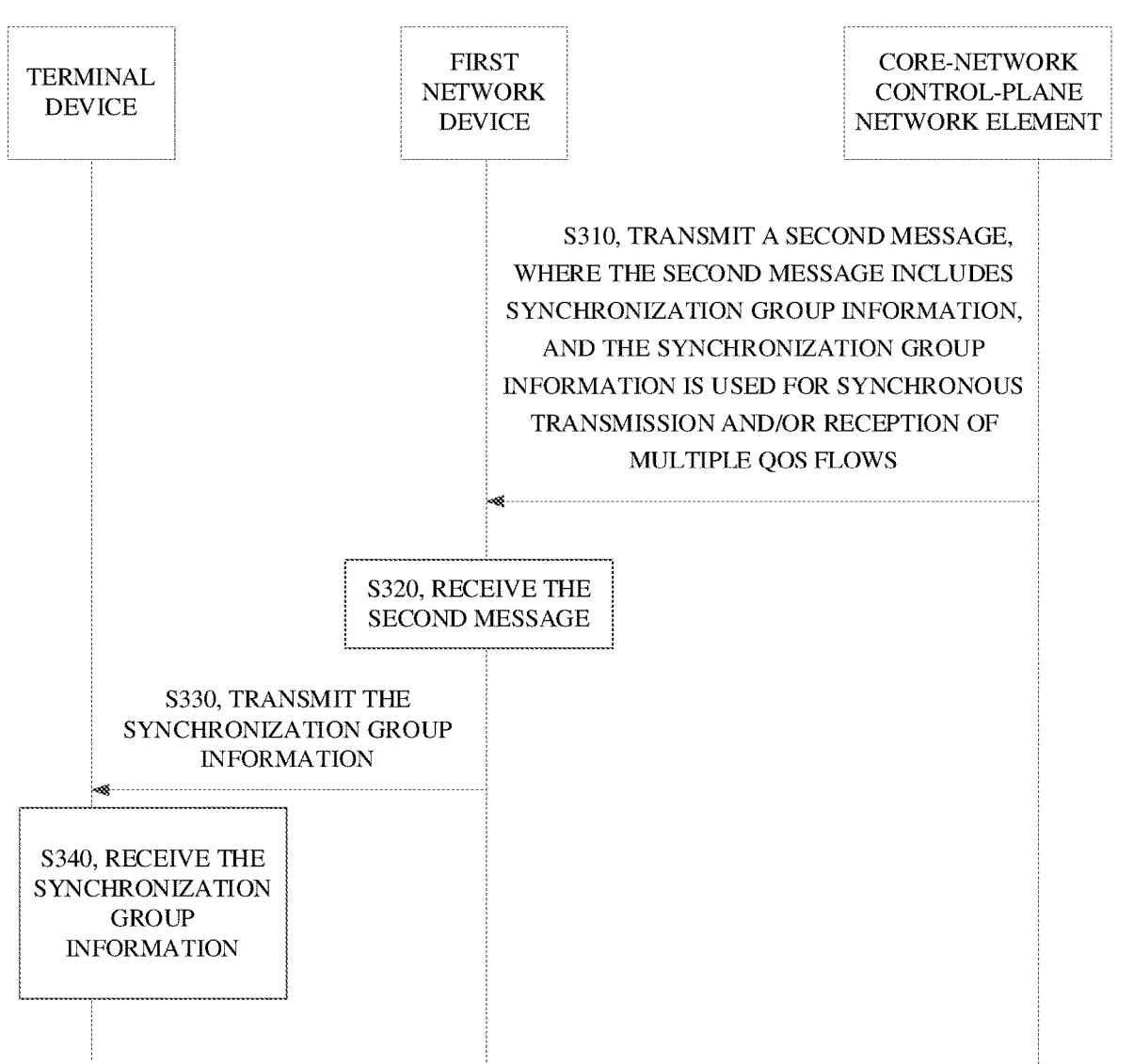
FIG. 3 is a schematic flowchart illustrating another transmission method provided in implementations of the disclosure.

Referring to FIG. 3, FIG. 3 is a schematic flowchart illustrating another transmission method provided in implementations of the disclosure. As illustrated in FIG. 3, the transmission method includes the following.

S310, a core-network control-plane network element transmits a second message to a first network device, where the second message includes synchronization group information, and the synchronization group information is used for synchronous transmission and/or reception of multiple QoS flows.

S320, the first network device receives the second message from the core-network control-plane network element.

S330, the first network device transmits the synchronization group information to a terminal device.

S340, the terminal device receives the synchronization group information from the first network device.

It can be understood that, for the specific implementation of operations at S310-S330, reference can be made to the specific implementation of the implementation illustrated in FIG. 2, which will not be repeated herein.

In implementations of the disclosure, the core-network control-plane network element notifies the first network device and the terminal device of transmission of the synchronization group information of the multi-modality service by transmitting the second message to the first network device. As such, the terminal device and/or the first network device can realize synchronous transmission and/or synchronous reception of different QoS flows of the multi-modality service according to the synchronization group information, thereby ensuring air-interface synchronous transmission.

Figure 4:
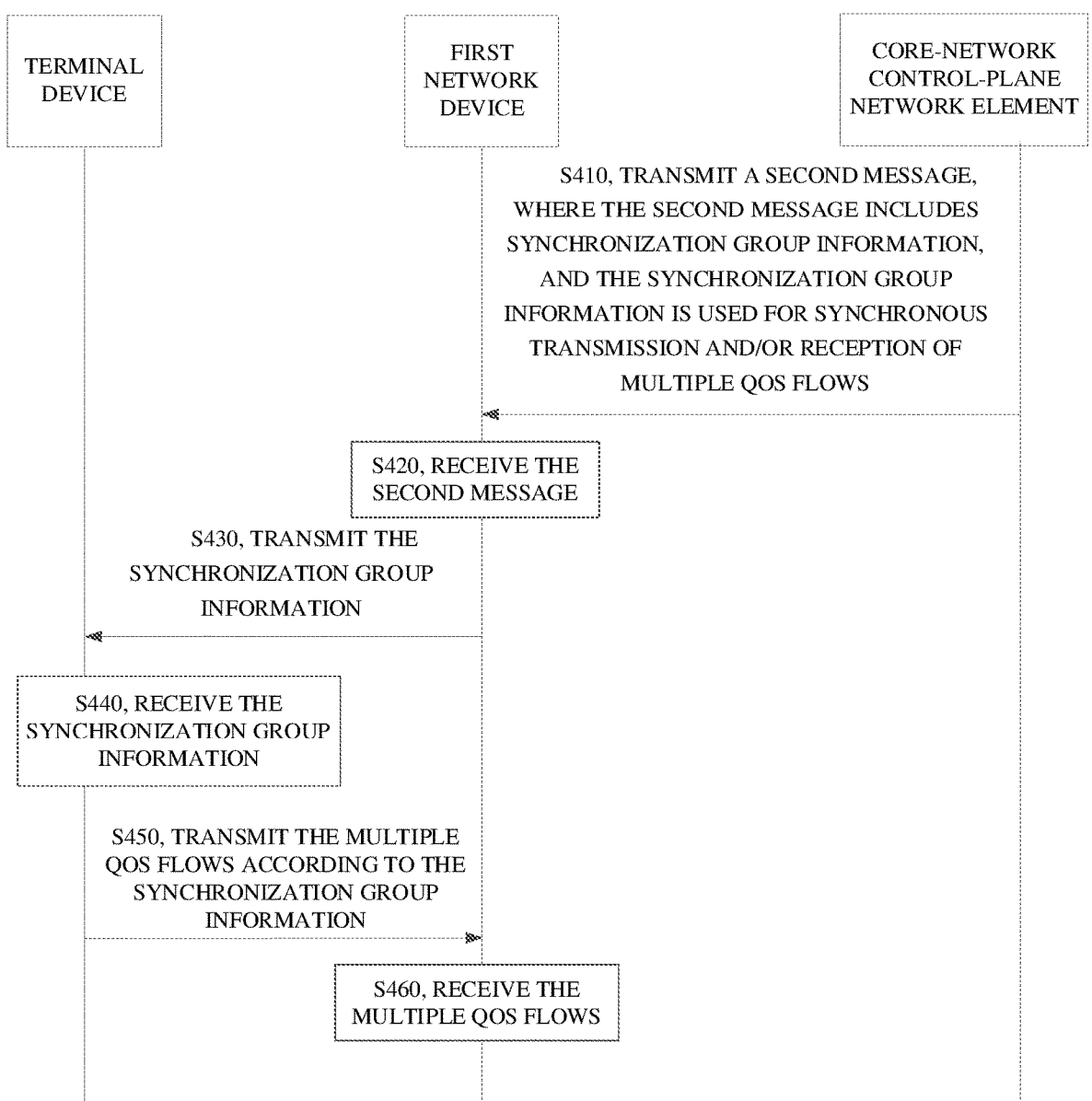
FIG. 4 is a schematic flowchart illustrating another transmission method provided in implementations of the disclosure.

Referring to FIG. 4, FIG. 4 is a schematic flowchart illustrating another transmission method provided in implementations of the disclosure. As illustrated in FIG. 4, the transmission method includes the following.

S410, a core-network control-plane network element transmits a second message to a first network device, where the second message includes synchronization group information, and the synchronization group information is used for synchronous transmission and/or reception of multiple QoS flows.

S420, the first network device receives the second message from the core-network control-plane network element.

S430, the first network device transmits the synchronization group information to a terminal device.

S440, the terminal device receives the synchronization group information from the first network device.

For the specific implementation of operations at S410-S440, reference can be made to the specific implementation of the implementation illustrated in FIG. 2, which will not be repeated herein.

S450, the terminal device transmits the multiple QoS flows to the first network device according to the synchronization group information.

In response to reception of the synchronization group information, the terminal device can synchronously transmit the multiple QoS flows to-be-transmitted in a buffer of the terminal device to the first network device according to the synchronization group information.

Optionally, a first QoS-flow group is mapped to a first DRB, a second QoS-flow group is mapped to a second DRB, a time interval between a transmission resource for the first DRB and a transmission resource for the second DRB is less than or equal to a synchronization time granularity, and the first QoS-flow group and the second QoS-flow group each include at least one QoS flow.

Specifically, the multiple QoS flows are in a mapping relationship with multiple DRBs, that is, one or more QoS flows are mapped to one DRB, and a time interval between transmission resources for the multiple DRBs is less than or equal to the synchronization time granularity.

Specifically, when the terminal device transmits QoS flow data of the multi-modality service, in response to multiple QoS flows of the multi-modality service being mapped to multiple DRBs, that is, one or multiple QoS flows may be mapped to one DRB, the terminal device can transmit QoS flow data in a synchronous transmission group on transmission resources close in time. That is, the QoS flow data in the synchronous transmission group can be transmitted on configured resources close in time. For example, in response to QoS flow 1 being mapped to DRB 1 and QoS flow 2 being mapped to DRB 2, the first network device configures the DRB 1 to be transmitted on a resource "configured grant (CG) 1" and configures the DRB 2 to be transmitted on a resource "CG 2", where a time interval between the CG 1 and the CG 2 is required to be less than the synchronization time granularity. The CG refers to a transmission resource pre-configured by a network side for uplink or downlink data transmission.

Optionally, the method further includes adjusting a transmission time of a first QoS flow to a first time. A difference between the first time and a transmission time of a second QoS flow is less than or equal to a synchronization time granularity, and the first QoS flow and the second QoS flow are any two QoS flows among the multiple QoS flows.

For a transmission resource dynamically scheduled, the terminal device can adjust a priority of transmission of QoS flow data, that is, adjust transmission resources for QoS flows. For example, the first network device configures that the QoS flow 1 is mapped to the DRB 1 and the QoS flow 2 is mapped to the DRB 2. When a data packet of the QoS flow 1 is transmitted at time t1, the terminal device can adjust a transmission time of a data packet of the QoS flow 2. For example, the data packet of the QoS flow 2 can be transmitted before t2 by occupying a transmission resource for other data to-be-transmitted or using another scheduled resource, where (t2−t1) is less than the synchronization time granularity. For example, an LCH priority of the DRB 1 is priority 1 and an LCH priority of the DRB 2 is priority 2, the terminal device can adjust the transmission time of the data packet of the QoS flow 2 and can temporarily adjust the LCH priority of the DRB 2 to priority 3, where the priority 3 is higher than or equal to the priority 1.

In a possible implementation, the method further includes transmitting a buffer status report (BSR) to the first network device. The BSR includes synchronous-transmission indication information, and the synchronous-transmission indication information indicates that a current buffer of the terminal device has a QoS flow to be transmitted synchronously.

In specific implementation, the terminal device can actively report the BSR to the first network device, where the BSR may carry the synchronous-transmission indication information, and the indication information indicates whether the current buffer of the terminal device has QoS flow data to be transmitted synchronously. In response to the synchronous-transmission indication information indicating that the current buffer has QoS flow data to be transmitted synchronously, the first network device can first allocate a transmission resource for the QoS flow data to be transmitted synchronously in the current buffer, so that the QoS flow data to be transmitted synchronously in the current buffer may be transmitted first. For example, the current buffer of the terminal device has QoS flow 1, QoS flow 2, and QoS flow 3, where the QoS flow 1 and the QoS flow 2 need to be transmitted synchronously. The first network device can configure or schedule a transmission resource for transmission of the QoS flow 1 and the QoS flow 2, in response to the synchronous-transmission indication information reported by the terminal device indicating that the current buffer of the terminal device has the QoS flow 1 and the QoS flow 2 that are to be transmitted synchronously.

Furthermore, the synchronous-transmission indication information in the BSR may indicate according to an LCH or an LCH group.

In implementations of the disclosure, the terminal device can adjust transmission times of QoS flows by adjusting transmission resources for QoS flows to be transmitted synchronously, so that the QoS flows to be transmitted synchronously can satisfy the requirement of synchronous transmission.

S460, the first network device receives the multiple QoS flows from the terminal device.

In response to reception of multiple data packets of QoS flows of the multi-modality service transmitted by the terminal device, a protocol layer of the first network device is responsible for delivering the received data packets of the QoS flows to an upper layer. The protocol layer may be a packet data convergence protocol (PDCP) layer, a service data adaptation protocol (SDAP) layer, or another protocol layer.

Optionally, the multiple QoS flows include a third QoS flow and a fourth QoS flow, the third QoS flow and the fourth QoS flow belong to a same synchronous transmission group, and the third QoS flow is a primary QoS flow. The method further includes: delivering a data packet of the third QoS flow to an upper layer subsequent to reception of the third QoS flow, and discarding a data packet of the fourth QoS flow in response to an interval between a reception time of the fourth QoS flow and a reception time of the third QoS flow being greater than a synchronization time granularity.

The protocol layer of the first network device can transmit a data packet of the primary QoS flow first in response to the data packet of the primary QoS flow arriving first, and discard a data packet of another QoS flow in response to a time difference between a reception time of the data packet of the another QoS flow and a reception time of the data packet of the primary QoS flow being greater than the synchronization time granularity.

Optionally, the method further includes delivering the third QoS flow and the fourth QoS flow to the upper layer subsequent to reception of the fourth QoS flow, in response to the interval between the reception time of the fourth QoS flow and the reception time of the third QoS flow being less than or equal to the synchronization time granularity.

Furthermore, the first network device can configure whether the terminal device discards the data packet of the another QoS flow in response to the synchronization time granularity being exceeded. In the case where the first network device configures that the terminal device does not discard the data packet of the another QoS flow, the protocol layer can transmit the data packet of the primary QoS flow first in response to the data packet of the primary QoS flow arriving first, and wait for a preset duration. The protocol layer can transmit the data packet of the another QoS flow in response to reception of the data packet of the another QoS flow within the preset duration. The protocol layer can discard the data packet of the another QoS flow received after the preset duration in response to the failure of reception of the data packet of the another QoS flow within the preset duration. In the case where the first network device configures that the terminal device discards the data packet of the another QoS flow, the terminal device directly discards the data packet of the another QoS flow in response to the time difference between the reception time of the data packet of the another QoS flow and the reception time of the data packet of the primary QoS flow being greater than the synchronization time granularity.

Optionally, the method further includes delivering the third QoS flow and the fourth QoS flow to the upper layer subsequent to reception of the fourth QoS flow, in response to the interval between the reception time of the fourth QoS flow and the reception time of the third QoS flow being less than or equal to the synchronization time granularity.

The protocol layer of the first network device can wait until the data packet of the primary QoS flow is received, in response to the data packet of the another QoS flow arriving first. The protocol layer delivers the data packet of the primary QoS flow and the data packet of the another QoS flow to the upper layer.

In implementations of the disclosure, when receiving data packets of QoS flows transmitted synchronously, the first network device performs upward delivery or discarding of the data packets in consideration of the synchronization group information, thereby realizing synchronous upward delivery of data packets of different QoS flows of the multi-modality service.

It can be seen that with the transmission method provided in implementations of the disclosure, the core-network control-plane network element transmits the synchronization group information to the first network device, and the first network device transmits the synchronization group information to the terminal device, so that the first network device and the terminal device can be notified of transmission of the synchronization group information of the multi-modality service. As such, the terminal device can realize synchronous transmission of different QoS flows of the multi-modality service according to the synchronization group information, and the first network device can realize synchronous reception of different QoS flows of the multi-modality service according to the synchronization group information, thereby ensuring air-interface synchronous transmission.

Figure 5:
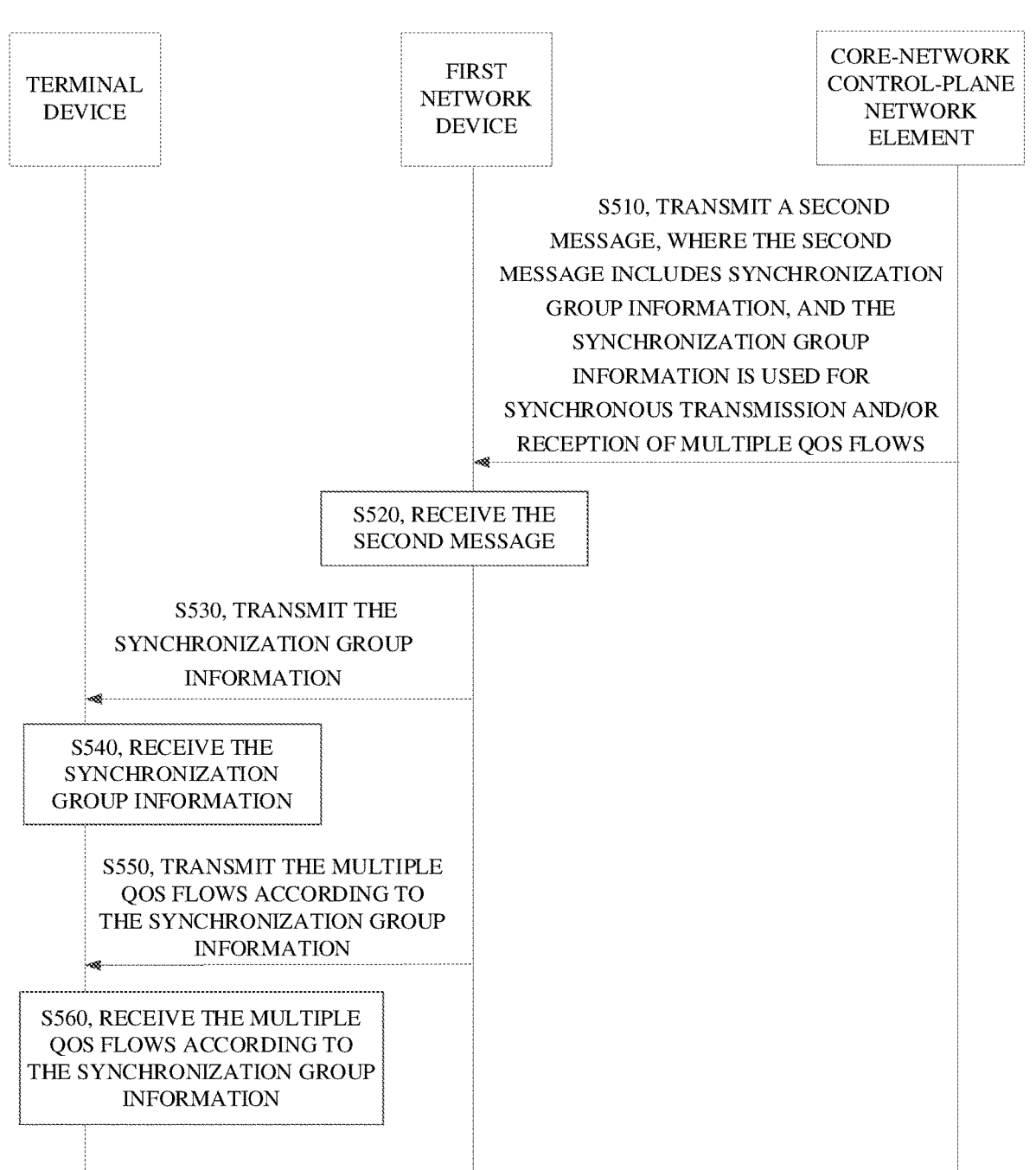
FIG. 5 is a schematic flowchart illustrating another transmission method provided in implementations of the disclosure.

Referring to FIG. 5, FIG. 5 is a schematic flowchart illustrating another transmission method provided in implementations of the disclosure. As illustrated in FIG. 5, the transmission method includes the following.

S510, a core-network control-plane network element transmits a second message to a first network device, where the second message includes synchronization group information, and the synchronization group information is used for synchronously transmission and/or reception of multiple QoS flows.

S520, the first network device receives the second message from the core-network control-plane network element.

S530, the first network device transmits the synchronization group information to a terminal device.

S540, the terminal device receives the synchronization group information from the first network device.

For the specific implementation of operations at S510-S540, reference can be made to the specific implementation of the implementation illustrated in FIG. 2, which will not be repeated herein.

S550, the first network device transmits the multiple QoS flows to the terminal device according to the synchronization group information.

In response to reception of the synchronization group information, the first network device can synchronously transmit the multiple QoS flows to-be-transmitted in a buffer of the first network device to the terminal device according to the synchronization group information.

Specifically, the multiple QoS flows are in a mapping relationship with multiple DRBs, and a time interval between transmission resources for the multiple DRBs is less than or equal to the synchronization time granularity.

Optionally, a first QoS-flow group is mapped to a first DRB, a second QoS-flow group is mapped to a second DRB. A time interval between a transmission resource for the first DRB and a transmission resource for the second DRB is less than or equal to a synchronization time granularity. The first QoS-flow group and the second QoS-flow group each include at least one QoS flow.

Specifically, when the first network device transmits QoS flow data of the multi-modality service, in response to multiple QoS flows of the multi-modality service being mapped to multiple DRBs, that is, one or multiple QoS flows may be mapped to one DRB, the first network device can transmit QoS flow data in a synchronous transmission group on transmission resources close in time. That is, the QoS flow data in the synchronous transmission group can be transmitted on configured resources close in time. For example, in response to QoS flow 1 being mapped to DRB 1 and QoS flow 2 being mapped to DRB 2, the DRB 1 is configured to be transmitted on a resource "CG 1", the DRB 2 is configured to be transmitted on a resource "CG 2", where a time interval between the CG 1 and the CG 2 is required to be less than the synchronization time granularity.

Optionally, the method further includes adjusting a transmission time of a first QoS flow to a first time. A difference between the first time and a transmission time of a second QoS flow is less than or equal to a synchronization time granularity, and the first QoS flow and the second QoS flow are any two QoS flows among the multiple QoS flows.

For a transmission resource dynamically scheduled, the first network device can adjust a priority of transmission of QoS flow data, that is, adjust a transmission resource for QoS flows. For example, on condition that that the QoS flow 1 is mapped to the DRB 1 and the QoS flow 2 is mapped to the DRB 2, when a data packet of the QoS flow 1 is transmitted at time t1, the first network device can adjust a transmission time of a data packet of the QoS flow 2. For example, the data packet of the QoS flow 2 can be transmitted before t2 by configuring a transmission resource for other data to-be-transmitted to the QoS flow 2 or using another scheduled resource, where (t2–t1) is less than the synchronization time granularity.

In specific implementation, in response to a current buffer of the first network device having QoS flow data to be transmitted synchronously, the first network device can first allocate a transmission resource for the data of the QoS flow to be transmitted synchronously in the current buffer, so that the QoS flow data to be transmitted synchronously in the current buffer may be transmitted first.

In implementations of the disclosure, the first network device can adjust transmission times of QoS flows by adjusting transmission resources for QoS flows to be transmitted synchronously, so that the QoS flows to be transmitted synchronously can satisfy the requirement of synchronous transmission.

S560, the terminal device receives the multiple QoS flows from the first network device according to the synchronization group information.

In response to reception of multiple data packets of QoS flows of the multi-modality service transmitted by the first network device, a protocol layer of the terminal device is responsible for delivering the received data packets of the QoS flows to an upper layer. The protocol layer may be a PDCP layer, an SDAP layer, or another protocol layer.

Optionally, the multiple QoS flows include a third QoS flow and a fourth QoS flow, the third QoS flow and the fourth QoS flow belong to a same synchronous transmission group, and the third QoS flow is a primary QoS flow. The method further includes: delivering a data packet of the third QoS flow to an upper layer subsequent to reception of the third QoS flow, and discarding a data packet of the fourth QoS flow in response to an interval between a reception time of the fourth QoS flow and a reception time of the third QoS flow being greater than a synchronization time granularity.

The protocol layer of the terminal device can transmit a data packet of the primary QoS flow first in response to the data packet of the primary QoS flow arriving first, and discard a data packet of another QoS flow in response to a time difference between a reception time of the data packet of the another QoS flow and a reception time of the data packet of the primary QoS flow being greater than the synchronization time granularity.

Optionally, the method further includes delivering the third QoS flow and the fourth QoS flow to the upper layer subsequent to reception of the fourth QoS flow, in response to the interval between the reception time of the fourth QoS flow and the reception time of the third QoS flow being less than or equal to the synchronization time granularity.

Furthermore, the terminal device can be configured whether to discard the data packet of the another QoS flow in response to the synchronization time granularity being exceeded, or the terminal device can be configured to receive configuration information from the first network device, where the configuration information can indicate whether the terminal device discards the data packet of the another QoS flow in response to the synchronization time granularity being exceeded. In the case where the first network device configures that the terminal device does not discard the data packet of the another QoS flow, the protocol layer of the terminal device can transmit the data packet of the primary QoS flow first in response to the data packet of the primary QoS flow arriving first, and wait for a preset duration. The protocol layer of the terminal device can transmit the data packet of the another QoS flow in response to reception of the data packet of the another QoS flow within the preset duration. The protocol layer can discard the data packet of the another QoS flow received after the preset duration in response to the failure of reception of the data packet of the another QoS flow within the preset duration. In the case where the first network device configures that the terminal device discards the data packet of the another QoS flow, the terminal device directly discards the data packet of the another QoS flow in response to the time difference between the reception time of the data packet of the another QoS flow and the reception time of the data packet of the primary QoS flow being greater than the synchronization time granularity.

Optionally, the method further includes delivering the third QoS flow and the fourth QoS flow to the upper layer in response to the reception time of the fourth QoS flow being earlier than or equal to the reception time of the third QoS flow.

The protocol layer of the first network device can wait until the data packet of the primary QoS flow is received, in response to the data packet of the another QoS flow arriving first. The protocol layer delivers the data packet of the primary QoS flow and the data packet of the another QoS flow to the upper layer.

In implementations of the disclosure, when receiving data packets of QoS flows transmitted synchronously, the terminal device performs upward delivery or discarding of the data packets in consideration of the synchronization group information, thereby realizing synchronous upward delivery of data packets of different QoS flows of the multi-modality service.

It can be seen that with the transmission method provided in implementations of the disclosure, the core network transmits the synchronization group information to the first network device, and the first network device transmits the synchronization group information to the terminal device, so that the first network device and the terminal device can be notified of transmission of the synchronization group information of the multi-modality service. As such, the first network device can realize synchronous transmission of different QoS flows of the multi-modality service according to the synchronization group information, and the terminal device can realize synchronous reception of different QoS flows of the multi-modality service according to the synchronization group information, thereby ensuring air-interface synchronous transmission.

Figure 6:
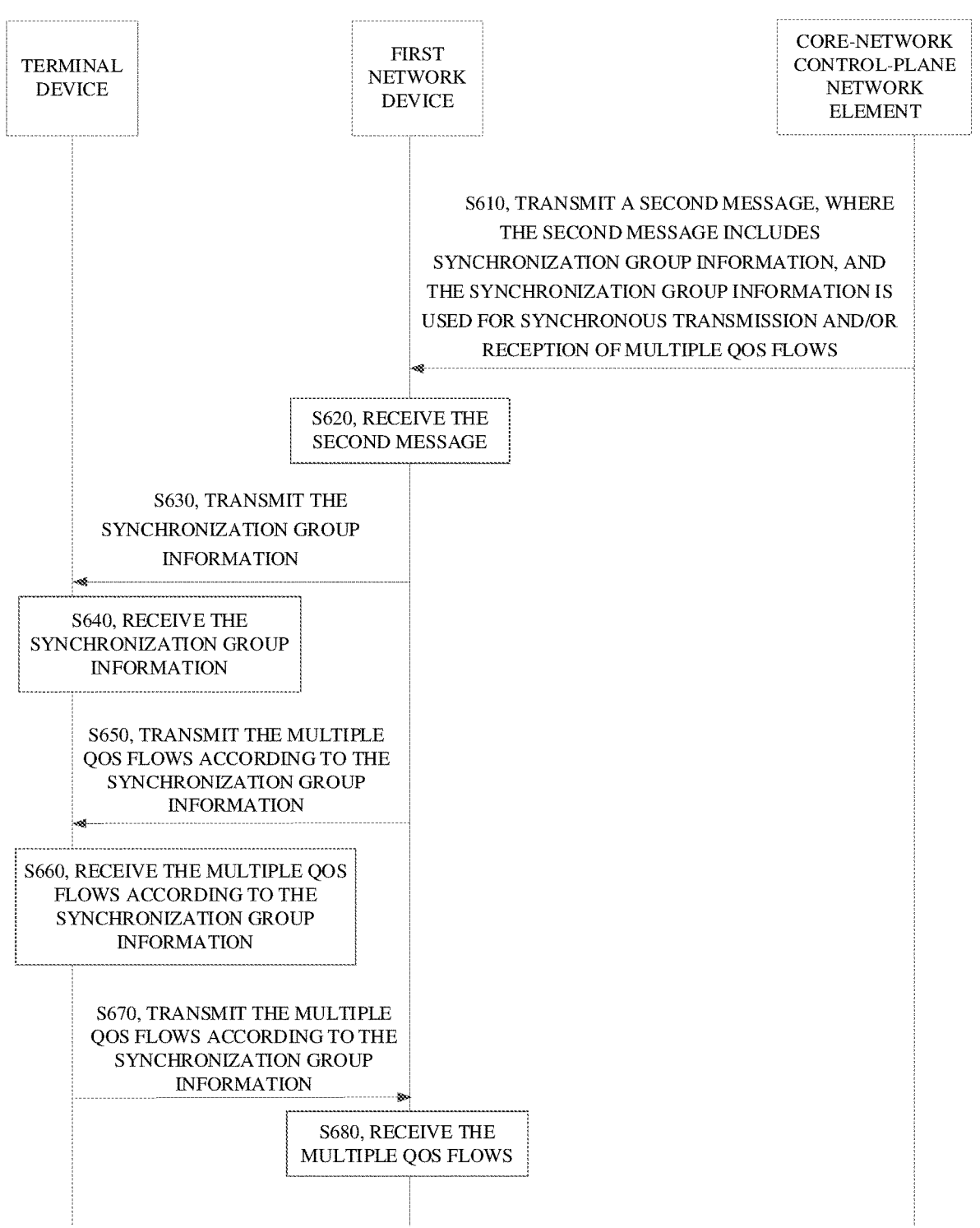
FIG. 6 is a schematic flowchart illustrating another transmission method provided in implementations of the disclosure.

Referring to FIG. 6, FIG. 6 is a schematic flowchart illustrating another transmission method provided in implementations of the disclosure. As illustrated in FIG. 6, the transmission method includes the following.

S610, a core-network control-plane network element transmits a second message to a first network device, where the second message includes synchronization group information, and the synchronization group information is used for synchronously transmission and/or reception of multiple QoS flows.

S620, the first network device receives the second message from the core-network control-plane network element.

S630, the first network device transmits the synchronization group information to a terminal device.

S640, the terminal device receives the synchronization group information from the first network device.

S650, the first network device transmits the multiple QoS flows to the terminal device according to the synchronization group information.

S660, the terminal device receives the multiple QoS flows from the first network device according to the synchronization group information.

S670, the terminal device transmits the multiple QoS flows to the first network device according to the synchronization group information.

S680, the first network device receives the multiple QoS flows from the terminal device.

It may be understood that, for the specific implementation of operations at S610-S680, reference can be made to specific implementations of the implementations illustrated in FIGS. 2, 4, and 5, which will not be repeated herein.

It can be seen that with the transmission method provided in implementations of the disclosure, the core network transmits the synchronization group information to the first network device, and the first network device transmits the synchronization group information to the terminal device, so that the first network device and the terminal device can be notified of transmission of the synchronization group information of the multi-modality service. As such, the first network device and the terminal device can realize synchronous transmission and synchronous reception of different QoS flows of the multi-modality service according to the synchronization group information, thereby ensuring air-interface synchronous transmission.

The foregoing solution of the implementations of the disclosure is mainly introduced from the viewpoint of execution of the method side. It can be understood that, in order to implement the above functions, the electronic device includes hardware structures and/or software modules for performing the respective functions. Those skilled in the art should easily recognize that, in combination with the units and algorithmic operations of various examples illustrated in the implementations provided herein, the disclosure can be implemented in hardware or a combination of the hardware and computer software. Whether a function is implemented by way of the hardware or hardware driven by the computer software depends on the particular application and design constraints of the technical solution. Those skilled in the art may use different methods to implement the illustrated functions for each particular application, but such implementation should not be considered as beyond the scope of the disclosure.

Figure 7:
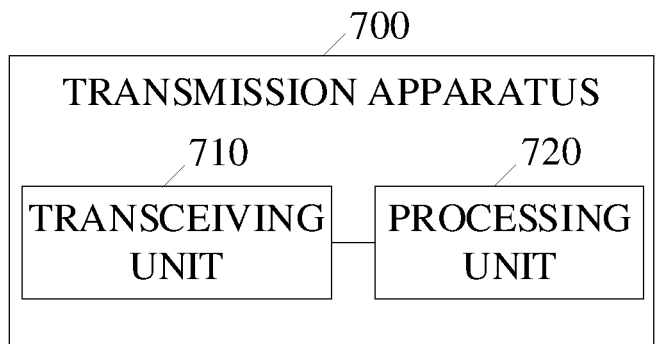
FIG. 7 is a block diagram of functional units of a transmission apparatus provided in implementations of the disclosure.

Referring to FIG. 7, FIG. 7 is a block diagram of functional units of a transmission apparatus 700 provided in implementations of the disclosure. The apparatus 700 may be a terminal device, a first network device, or a core-network control-plane network element. The apparatus 700 includes a transceiving unit 710 and a processing unit 720.

In a possible implementation, the apparatus 700 is configured to perform processes and operations performed by the terminal device in the above transmission method.

The transceiving unit 710 is configured to: transmit multiple QoS flows to a first network device according to synchronization group information, or receive the multiple QoS flows from the first network device according to the synchronization group information. The synchronization group information indicates synchronous transmission and/or reception of the multiple QoS flows.

Optionally, the transceiving unit 710 is further configured to receive a first message from the first network device, where the first message includes the synchronization group information.

Optionally, the synchronization group information includes at least one of: a synchronization time granularity, a primary QoS flow indicator, or a synchronization group identifier. The synchronization time granularity indicates a maximum transmission interval of synchronous transmission between different QoS flows in a synchronous transmission group. The primary QoS flow indicator indicates a primary QoS flow among the multiple QoS flows, and the primary QoS flow is a reference QoS flow for TTI calculation in the synchronous transmission group.

Optionally, a first QoS-flow group is mapped to a first DRB, and a second QoS-flow group is mapped to a second DRB. A time interval between a transmission resource for the first DRB and a transmission resource for the second DRB is less than or equal to a synchronization time granularity, and the first QoS-flow group and the second QoS-flow group each include at least one QoS flow.

Optionally, the processing unit 720 is configured to adjust a transmission time of a first QoS flow to a first time. A difference between the first time and a transmission time of a second QoS flow is less than or equal to a synchronization time granularity, and the first QoS flow and the second QoS flow are any two QoS flows among the multiple QoS flows.

Optionally, the transceiving unit 710 is further configured to transmit a BSR to the first network device. The BSR includes synchronous-transmission indication information, and the synchronous-transmission indication information indicates that a current buffer of the terminal device has a QoS flow to be transmitted synchronously.

Optionally, the multiple QoS flows include a third QoS flow and a fourth QoS flow, the third QoS flow and the fourth QoS flow belong to a same synchronous transmission group, and the third QoS flow is a primary QoS flow. The transceiving unit 710 configured to receive the multiple QoS flows from the first network device according to the synchronization group information is configured to: deliver a data packet of the third QoS flow to an upper layer subsequent to reception of the third QoS flow, and discard a data packet of the fourth QoS flow in response to an interval between a reception time of the fourth QoS flow and a reception time of the third QoS flow being greater than a synchronization time granularity.

Optionally, the transceiving unit 710 is further configured to deliver the third QoS flow and the fourth QoS flow to the upper layer subsequent to reception of the fourth QoS flow, in response to the interval between the reception time of the fourth QoS flow and the reception time of the third QoS flow being less than or equal to the synchronization time granularity.

Optionally, the transceiving unit 710 is further configured to deliver the third QoS flow and the fourth QoS flow to the upper layer in response to the reception time of the fourth QoS flow being earlier than or equal to the reception time of the third QoS flow.

Optionally, the first message is an RRC-protocol-layer message.

Optionally, the first message includes an NAS message, and the synchronization group information is carried in the NAS message.

In another possible implementation, the apparatus 700 is configured to perform processes and operations performed by the first network device in the above transmission method.

The transceiving unit 710 is configured to: transmit multiple QoS flows to a terminal device according to synchronization group information, or receive the multiple QoS flows from the terminal device according to the synchronization group information. The synchronization group information is used for synchronous transmission and/or reception of the multiple QoS flows.

Optionally, the transceiving unit 710 is further configured to transmit a first message to the terminal device, where the first message includes the synchronization group information.

Optionally, the transceiving unit 710 is further configured to receive a second message from a core-network control-plane network element, where the second message includes the synchronization group information. Optionally, the first network device is an access network device that establishes a control-plane connection with the core-network control-plane network element.

Optionally, the synchronization group information includes at least one of: a synchronization time granularity, a primary QoS flow indicator, or a synchronization group identifier. The synchronization time granularity indicates a maximum transmission interval of synchronous transmission between different QoS flows in a synchronous transmission group. The primary QoS flow indicator indicates a primary QoS flow among the multiple QoS flows, and the primary QoS flow is a reference QoS flow for TTI calculation in the synchronous transmission group.

Optionally, a first QoS-flow group is mapped to a first DRB, and a second QoS-flow group is mapped to a second DRB. A time interval between a transmission resource for the first DRB and a transmission resource for the second DRB is less than or equal to a synchronization time granularity, and the first QoS-flow group and the second QoS-flow group each include at least one QoS flow.

Optionally, the transceiving unit 710 is further configured to adjust a transmission time of a first QoS flow to a first time. A difference between the first time and a transmission time of a second QoS flow is less than or equal to a synchronization time granularity, and the first QoS flow and the second QoS flow are any two QoS flows among the multiple QoS flows.

Optionally, the multiple QoS flows include a third QoS flow and a fourth QoS flow, the third QoS flow and the fourth QoS flow belong to a same synchronous transmission group, and the third QoS flow is a primary QoS flow. The transceiving unit 710 configured to receive the multiple QoS flows from the terminal device according to the synchronization group information is configured to: deliver a data packet of the third QoS flow to an upper layer subsequent to reception of the third QoS flow, and discard a data packet of the fourth QoS flow in response to an interval between a reception time of the fourth QoS flow and a reception time of the third QoS flow being greater than a synchronization time granularity.

Optionally, the transceiving unit 710 is further configured to deliver the third QoS flow and the fourth QoS flow to the upper layer subsequent to reception of the fourth QoS flow, in response to the interval between the reception time of the fourth QoS flow and the reception time of the third QoS flow being less than or equal to the synchronization time granularity.

Optionally, the transceiving unit 710 is further configured to deliver the third QoS flow and the fourth QoS flow to the upper layer in response to the reception time of the fourth QoS flow being earlier than or equal to the reception time of the third QoS flow.

Optionally, the first message is an RRC-protocol-layer message.

Optionally, the first message includes an NAS message, and the synchronization group information is carried in the NAS message.

In another possible implementation, the apparatus 700 is configured to perform processes and operations performed by the first network device in the above transmission method.

The transceiving unit 710 is configured to: receive synchronization group information, where the synchronization group information is used for synchronous transmission and/or reception of multiple QoS flows, and transmit the synchronization group information.

Optionally, the transceiving unit 710 configured to transmit the synchronization group information is specifically configured to: receive the synchronization group information from a core-network control-plane network element, and transmit the synchronization group information to a terminal device and/or a second network device, where the second network device is a network device that receives a handover request transmitted by the first network device.

Optionally, the transceiving unit 710 is further configured to transmit a third message to the second network device. The third message includes the synchronization group information. The second network device is a network device that receives a handover request transmitted by the first network device.

Optionally, the first network device is a network device that establishes a control-plane connection with the core-network control-plane network element.

Optionally, the transceiving unit 710 configured to transmit the synchronization group information is specifically configured to: receive the synchronization group information from a third network device, and transmit the synchronization group information to a second network device. The third network device is a network device that transmits a handover request to the first network device.

Optionally, the transceiving unit 710 is further configured to transmit the third message to a fourth network device. The third message includes the synchronization group information. The fourth network device is a network device that has established a/no connection with the terminal device and has established no control-plane connection with the core-network control-plane network element.

In another possible implementation, the apparatus 700 is configured to perform processes and operations performed by the core-network control-plane network element in the above transmission method.

The processing unit 720 is configured to obtain synchronization group information, where the synchronization group information is used for synchronous transmission and/or reception of multiple QoS flows. The transceiving unit 710 is configured to transmit a second message to a first network device, where the second message includes the synchronization group information.

Optionally, the synchronization group information includes at least one of: a synchronization time granularity, a primary QoS flow indicator, or a synchronization group identifier. The synchronization time granularity indicates a maximum transmission interval of synchronous transmission between different QoS flows in a synchronous transmission group. The primary QoS flow indicator indicates a primary QoS flow among the multiple QoS flows, and the primary QoS flow is a reference QoS flow for TTI calculation in the synchronous transmission group.

It may be understood that functions of various program modules of the transmission apparatus in implementations of the disclosure may be specifically implemented according to the method in the foregoing method implementations. For a specific implementation process, reference may be made to related description of the foregoing method implementations, which will not be repeated herein.

It should be appreciated that the apparatus 700 herein is in the form of a functional unit. The term "unit" herein may refer to an application specific integrated circuit (ASIC), an electronic circuit, a processor (such as a shared processor, a dedicated processor, or a set of processors) and a memory configured to execute one or more software or firmware programs, a combination logic circuit, and/or other suitable assemblies that support the functions described. In an optional example, a person skilled in the art may understand that the apparatus 700 may specifically be the terminal device and the network device in the foregoing implementations, and the apparatus 700 may be configured to perform processes and/or operations corresponding to the terminal device, the first network device, and the core-network control-plane network element in the foregoing method implementations, which is not repeated herein to avoid repetition.

The apparatus 700 in each of the foregoing solutions has functions of implementing corresponding operations performed by the terminal device, the first network device, and the core-network control-plane network element in the foregoing method. The functions may be implemented by hardware or by hardware executing corresponding software. The hardware or software includes one or more modules corresponding to the foregoing functions. For example, the processing unit 720 may be replaced by a processor, and the transceiving unit 710 may be replaced by a transmitter and a receiver, to separately perform the transceiving operation and the related processing operation in each method implementation.

In implementations of the disclosure, the apparatus 700 in FIG. 7 may also be a chip, a chip module, a UE, or a chip system, for example, a system on chip (SoC). Correspondingly, the transceiver unit 710 may be a transceiver circuit of the chip, which is not limited herein.

Figure 8:
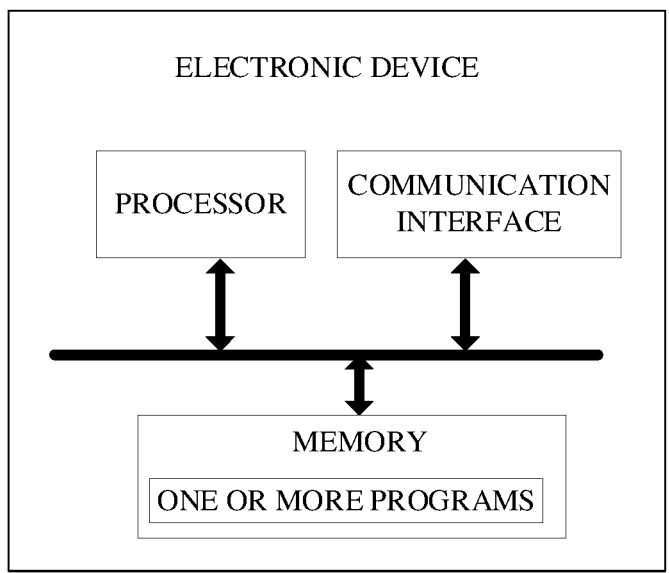
FIG. 8 is a schematic structural diagram of an electronic device provided in implementations of the disclosure.

Referring to FIG. 8, FIG. 8 is a schematic structural diagram of an electronic device provided in implementations of the disclosure. The electronic device includes one or more processors, one or more memories, one or more communication interfaces, and one or more programs. The one or more programs are stored in the one or more memories and configured to be executed by the one or more processors.

In a possible implementation, the electronic device may be a terminal device. The above programs include instructions configured to receive a first message from a first network device, where the first message includes synchronization group information of a multi-modality service.

The multi-modality service includes multiple QoS flows, and the synchronization group information is used for synchronous transmission and/or reception of the multiple QoS flows.

In a possible implementation, the electronic device may be a first network device. The above programs include instructions configured to transmit a first message to a terminal device, where the first message includes synchronization group information of a multi-modality service. The multi-modality service includes multiple QoS flows, and the synchronization group information is used for synchronous transmission and/or reception of the multiple QoS flows.

In a possible implementation, the electronic device may be a first network device. The above programs include instructions configured to: receive synchronization group information, where the synchronization group information is used for synchronous transmission and/or reception of the multiple QoS flows, and transmit the synchronization group information.

In a possible implementation, the electronic device may be a core-network control-plane network element. The above programs include instructions configured to: obtain synchronization group information, where the synchronization group information is used for synchronous transmission and/or reception of the multiple QoS flows, and transmit a second message to a first network device, where the second message includes the synchronization group information.

All related content of each scene involved in the foregoing method implementations may be referred to functional description of corresponding functional modules, which will not be repeated herein.

It should be understood that the foregoing memories may include a read-only memory (ROM) and a random access memory (RAM), and are configured to provide instructions and data for the processor. The memories may also include non-volatile RAMs. For example, the memory may also store device-type information.

In implementations of the disclosure, the processor of the above apparatus may be a central processing unit (CPU), and may also be other general-purpose processors, digital signal processors (DSP), ASICs, field programmable gate arrays (FPGAs), other programmable logic devices, discrete gates or transistor logic devices, discrete hardware components, etc. The general-purpose processor may be a microprocessor, or the processor may be any conventional processor or the like.

During implementation, each operation of the foregoing method may be completed by an integrated logic circuit in the form of hardware or an instruction in the form of software in the processor. The operations of the method disclosed in implementations of the disclosure may be directly implemented as a hardware processor, or may be performed by hardware and software units in the processor. The software unit can be located in a storage medium such as an RAM, a flash memory, an ROM, a programmable ROM (PROM), or an electrically erasable programmable memory, a register, and the like. The storage medium is located in the memory. The processor execute the instructions in the memory, and completes the operations of the above method with the hardware thereof, which will not be described in detail to avoid repetition.

A chip is further provided in implementations of the disclosure. The chip is configured to obtain a first message from a first network device. The first message includes synchronization group information of a multi-modality service, the multi-modality service includes multiple QoS flows, and the synchronization group information indicates synchronous transmission and/or reception of the multiple QoS flows.

A chip module is further provided in implementations of the disclosure. The chip module includes a transceiving assembly and a chip. The chip is configured to obtain, via the transceiving assembly, a first message from a first network device. The first message includes synchronization group information of a multi-modality service, the multi-modality service includes multiple QoS flows, and the synchronization group information indicates synchronous transmission and/or reception of the multiple QoS flows.

A chip is further provided in implementations of the disclosure. The chip is configured to output a first message to-be-transmitted to a terminal device. The first message includes synchronization group information of a multi-modality service, the multi-modality service includes multiple QoS flows, and the synchronization group information indicates synchronous transmission and/or reception of the multiple QoS flows.

A chip module is further provided in implementations of the disclosure. The chip module includes a transceiving assembly and a chip. The chip is configured to transmit, via the transceiving assembly, a first message to a terminal device. The first message includes synchronization group information of a multi-modality service, the multi-modality service includes multiple QoS flows, and the synchronization group information indicates synchronous transmission and/or reception of the multiple QoS flows.

A computer storage medium is further provided in implementations of the disclosure. The computer storage medium stores computer programs used for electronic data interchange. The computer programs are operable with a computer to perform part or all of operations of any one of methods in the foregoing method implementations.

A computer program product is further provided in implementations of the disclosure. The computer program product includes a non-transitory computer-readable storage medium that stores computer programs. The computer programs are operable with a computer to perform part or all of operations of any one of methods in the foregoing method implementations. The computer program product may be a software installation package.

It is to be noted that for the sake of simplicity, the foregoing method implementations are described as a series of action combinations. However, it will be appreciated by those skilled in the art that the disclosure is not limited by the sequence of actions described. According to the disclosure, some steps may be performed in other orders or simultaneously. Besides, it will be appreciated by those skilled in the art that the implementations described in the specification are preferred implementations, and the actions and modules involved are not necessarily essential to the disclosure.

In the foregoing implementations, the description of each implementation has its own emphasis. For the parts not described in detail in one implementation, reference may be made to related descriptions in other implementations.

In several implementations provided in the disclosure, it will be appreciated that the apparatuses disclosed may also be implemented in various other manners. For example, the above apparatus implementations are merely illustrative, e.g., the division of units is only a division of logical functions, and there may exist other manners of division in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interfaces, apparatuses, or units, and may be electrical, or otherwise.

Units illustrated as separated parts may or may not be physically separated. Components or parts displayed as units may or may not be physical units, and may reside at one location or may be distributed to multiple network units. Part of or all of the units may be selectively adopted according to practical needs to achieve desired objectives of the solutions of implementations.

In addition, various functional units described in various implementations of the disclosure may be integrated into one processing unit or may be presented as a number of physically separated units, and two or more units may be integrated into one unit. The integrated unit may be implemented by a form of hardware or a software functional unit.

If the integrated units are implemented as software functional units and sold or used as standalone products, they may be stored in a computer readable memory. According to such an understanding, the essential technical solution, or the portion that contributes to the related art, or all or part of the technical solution of the disclosure may be expressed as software products. The computer software products can be stored in a memory and may include multiple instructions that, when executed, can cause a computing device (e.g., a personal computer, a server, a TRP, etc.) to execute all or part of steps of the methods described in various implementations of the disclosure. The above memory may include various kinds of media that can store program codes, such as a universal serial bus (USB) flash disk, an ROM, an RAM, a mobile hard disc, a magnetic disk, or an optical disk.

It will be understood by those of ordinary skill in the art that all or part of the steps of the various methods in the implementations described above may be accomplished by means of a program to instruct associated hardware, and the program may be stored in a computer-readable memory, which may include a flash disk, an ROM, an RAM, a magnetic disk, or an optical disk.

The above implementations in the disclosure are introduced in detail. Principles and implementation manners of the disclosure are elaborated with specific implementations herein. The illustration of implementations above is only used to help understanding of methods and core ideas of the disclosure. At the same time, for those of ordinary skill in the art, according to ideas of the disclosure, there will be changes in the specific implementation manners and application scope. In summary, contents of this specification should not be understood as limitation on the disclosure.

A transmission method and a transmission apparatus are provided in implementations of the disclosure, which can realize synchronous transmission and/or synchronous reception of different quality of service (QoS) flows of a multi-modality service, thereby ensuring air-interface synchronous transmission.

In a first aspect, a transmission method is provided in implementations of the disclosure. The method is applicable to a terminal device and includes: transmitting multiple QoS flows to a first network device according to synchronization group information, or receiving the multiple QoS flows from the first network device according to the synchronization group information. The synchronization group information indicates synchronous transmission and/or reception of the multiple QoS flows.

In a second aspect, a transmission method is provided in implementations of the disclosure. The method is applicable to a first network device and includes: transmitting multiple QoS flows to a terminal device according to synchronization group information, or receiving the multiple QoS flows from the terminal device according to the synchronization group information. The synchronization group information is used for synchronous transmission and/or reception of the multiple QoS flows.

In a third aspect, a transmission method is provided in implementations of the disclosure. The method is applicable to a first network device and includes: receiving synchronization group information, where the synchronization group information is used for synchronous transmission and/or reception of multiple QoS flows, and transmitting the synchronization group information.

In a fourth aspect, a transmission method is provided in implementations of the disclosure. The method is applicable to a core-network control-plane network element and includes: obtaining synchronization group information, where the synchronization group information is used for synchronous transmission and/or reception of multiple QoS flows, and transmitting a second message to a first network device, where the second message includes the synchronization group information.

In a fifth aspect, a transmission apparatus is provided in implementations of the disclosure. The transmission apparatus is applicable to a terminal device and includes a transceiving unit. The transceiving unit is configured to: transmit multiple QoS flows to a first network device according to synchronization group information, or receive the multiple QoS flows from the first network device according to the synchronization group information. The synchronization group information indicates synchronous transmission and/or reception of the multiple QoS flows.

In a sixth aspect, a transmission apparatus is provided in implementations of the disclosure. The transmission apparatus is applicable to a first network device and includes a transceiving unit. The transceiving unit is configured to: transmit multiple QoS flows to a terminal device according to synchronization group information, or receive the multiple QoS flows from the terminal device according to the synchronization group information. The synchronization group information is used for synchronous transmission and/or reception of the multiple QoS flows.

In a seventh aspect, a transmission apparatus is provided in implementations of the disclosure. The transmission apparatus is applicable to a first network device and includes a transceiving unit. The transceiving unit is configured to: receive synchronization group information, where the synchronization group information is used for synchronous transmission and/or reception of multiple QoS flows, and transmit the synchronization group information.

In an eighth aspect, a transmission apparatus is provided in implementations of the disclosure. The transmission apparatus is applicable to a core-network control-plane network element and includes a processing unit and a transceiving unit. The processing unit is configured to obtain synchronization group information, where the synchronization group information is used for synchronous transmission and/or reception of multiple QoS flows. The transceiving unit is configured to transmit a second message to a first network device, where the second message includes the synchronization group information.

In a ninth aspect, a chip is provided in implementations of the disclosure. The chip is configured to: output, according to synchronization group information, multiple QoS flows to-be-transmitted to a first network device, or obtain, according to the synchronization group information, the multiple QoS flows from the first network device. The synchronization group information indicates synchronous transmission and/or reception of the multiple QoS flows.

In a tenth aspect, a chip module is provided in implementations of the disclosure. The chip module includes a transceiving assembly and a chip. The chip is configured to: output, via the transceiving assembly, multiple QoS flows to-be-transmitted to a first network device according to synchronization group information, or obtain, via the transceiving assembly, the multiple QoS flows from the first network device according to synchronization group information. The synchronization group information indicates synchronous transmission and/or reception of the multiple QoS flows.

In an eleventh aspect, a chip is provided in implementations of the disclosure. The chip is configured to: output, according to synchronization group information, multiple QoS flows to-be-transmitted to a terminal device, or obtain, according to the synchronization group information, the multiple QoS flows from the terminal device. The synchronization group information is used for synchronous transmission and/or reception of the multiple QoS flows.

In a twelfth aspect, a chip module is provided in implementations of the disclosure. The chip module includes a transceiving assembly and a chip. The chip is configured to: output, via the transceiving assembly, multiple QoS flows to-be-transmitted to a terminal device according to synchronization group information, or obtain, via the transceiving assembly, the multiple QoS flows from the terminal device according to synchronization group information. The synchronization group information is used for synchronous transmission and/or reception of the multiple QoS flows.

In a thirteenth aspect, a chip is provided in implementations of the disclosure. The chip is configured to: obtain synchronization group information, where the synchronization group information is used for synchronous transmission and/or reception of multiple QoS flows, and output the synchronization group information.

In a fourteenth aspect, a chip module is provided in implementations of the disclosure. The chip module includes a transceiving assembly and a chip. The chip is configured to: obtain, via the transceiving assembly, synchronization group information, where the synchronization group information is used for synchronous transmission and/or reception of multiple QoS flows, and output the synchronization group information.

In a fifteenth aspect, a chip is provided in implementations of the disclosure. The chip is configured to: obtain synchronization group information, where the synchronization group information is used for synchronous transmission and/or reception of multiple QoS flows, and transmit a second message to a first network device, where the second message includes the synchronization group information.

In a sixteenth aspect, a chip module is provided in implementations of the disclosure. The chip module includes a transceiving assembly and a chip. The chip is configured to: obtain, via the transceiving assembly, synchronization group information, where the synchronization group information is used for synchronous transmission and/or reception of multiple QoS flows, and transmit a second message to a first network device, where the second message includes the synchronization group information.

In a seventeenth aspect, an electronic device is provided in implementations of the disclosure. The electronic device includes a processor, a memory, a communication interface, and one or more programs. The one or more programs are stored in the memory and configured to be executed by the processor. The programs include instructions for performing operations in the method in the first aspect, the second aspect, the third aspect, or the fourth aspect.

In an eighteenth aspect, a computer-readable storage medium is provided in implementations of the disclosure. The computer-readable storage medium stores computer programs used for electronic data interchange. The computer programs are operable with a computer to perform operations in the method in the first aspect, the second aspect, the third aspect, or the fourth aspect.

In a nineteenth aspect, a computer program product is provided in implementations of the disclosure. The computer program product includes a non-transitory computer-readable storage medium that stores computer programs. The computer programs are operable with a computer to perform part of or all of operations in the method in the first aspect, the second aspect, the third aspect, or the fourth aspect. The computer program product may be a software installation package.

With the technical solution provided in the disclosure, the terminal device transmits the multiple QoS flows to the first network device according to the synchronization group information, or receives the multiple QoS flows from the first network device according to the synchronization group information. The synchronization group information indicates synchronous transmission and/or reception of the multiple QoS flows. In the disclosure, the terminal device can realize synchronous transmission and/or synchronous reception of different QoS flows of the multi-modality service according to the synchronization group information, thereby ensuring air-interface synchronous transmission.

What is claimed is:

1. A transmission method, applicable to a terminal device and comprising:

transmitting a plurality of quality of service (QoS) flows to a first network device according to synchronization group information; or receiving the plurality of QoS flows from the first network device according to the synchronization group information, wherein the synchronization group information indicates synchronous transmission and/or reception of the plurality of QoS flows, and wherein the method further comprises:

transmitting a buffer status report (BSR) to the first network device, wherein the BSR comprises synchronous-transmission indication information, and the synchronous-transmission indication information indicates that a current buffer of the terminal device has a QoS flow to be transmitted synchronously.

2. The method of claim 1, further comprising:

receiving a first message from the first network device, wherein the first message comprises the synchronization group information.

3. The method of claim 2, wherein the first message is a radio resource control (RRC)-protocol-layer message.

4. The method of claim 2, wherein the first message comprises a non-access stratum (NAS) message, and the synchronization group information is carried in the NAS message.

5. The method of claim 1, wherein the synchronization group information comprises at least one of: a synchronization time granularity, a primary QoS flow indicator, or a synchronization group identifier, wherein the synchronization time granularity indicates a maximum transmission interval of synchronous transmission between different QoS flows in a synchronous transmission group, the primary QoS flow indicator indicates a primary QoS flow among the plurality of QoS flows, and the primary QoS flow is a reference QoS flow for transmission time interval (TTI) calculation in the synchronous transmission group.

6. The method of claim 1, wherein a first QoS-flow group is mapped to a first data radio bearer (DRB), a second QoS-flow group is mapped to a second DRB, a time interval between a transmission resource for the first DRB and a transmission resource for the second DRB is less than or equal to a synchronization time granularity, and the first QoS-flow group and the second QoS-flow group each comprise at least one QoS flow.

7. The method of claim 1, further comprising:

adjusting a transmission time of a first QoS flow to a first time, wherein a difference between the first time and a transmission time of a second QoS flow is less than or equal to a synchronization time granularity, and the first QoS flow and the second QoS flow are any two QoS flows among the plurality of QoS flows.

8. The method of claim 1, wherein the plurality of QoS flows comprise a third QoS flow and a fourth QoS flow, the third QoS flow and the fourth QoS flow belong to a same synchronous transmission group, and the third QoS flow is a primary QoS flow; and receiving the plurality of QoS flows from the first network device according to the synchronization group information comprises:

delivering a data packet of the third QoS flow to an upper layer subsequent to reception of the third QoS flow; and discarding a data packet of the fourth QoS flow in response to an interval between a reception time of the fourth QoS flow and a reception time of the third QoS flow being greater than a synchronization time granularity.

9. The method of claim 8, further comprising:

delivering the third QoS flow and the fourth QoS flow to the upper layer subsequent to reception of the fourth QoS flow, in response to the interval between the reception time of the fourth QoS flow and the reception time of the third QoS flow being less than or equal to the synchronization time granularity.

10. The method of claim 8, further comprising:

delivering the third QoS flow and the fourth QoS flow to the upper layer in response to the reception time of the fourth QoS flow being earlier than or equal to the reception time of the third QoS flow.

11. A non-transitory computer-readable storage medium storing computer programs used for electronic data interchange, the computer programs being operable with a computer to:

transmit a plurality of quality of service (QoS) flows to a first network device according to synchronization group information; or receive the plurality of QoS flows from the first network device according to the synchronization group information, wherein the synchronization group information indicates synchronous transmission and/or reception of the plurality of QoS flows, and wherein the computer programs are further operable with the computer to:

transmit a buffer status report (BSR) to the first network device, wherein the BSR comprises synchronous-transmission indication information, and the synchronous-transmission indication information indicates that a current buffer of the terminal device has a QoS flow to be transmitted synchronously.

12. A terminal device, comprising:

a transceiver;

a memory configured to store one or more programs; and a processor configured to execute the one or more programs to cause the transceiver to:

transmit a plurality of quality of service (QoS) flows to a first network device according to synchronization group information; or receive the plurality of QoS flows from the first network device according to the synchronization group information, wherein the synchronization group information indicates synchronous transmission and/or reception of the plurality of QoS flows, and wherein the processor is further configured to cause the transceiver to:

transmit a buffer status report (BSR) to the first network device, wherein the BSR comprises synchronous-transmission indication information, and the synchronous-transmission indication information indicates that a current buffer of the terminal device has a QoS flow to be transmitted synchronously.

13. The terminal device of claim 12, wherein the processor is further configured to cause the transceiver to:

receive a first message from the first network device, wherein the first message comprises the synchronization group information.

14. The terminal device of claim 12, wherein the synchronization group information comprises at least one of: a synchronization time granularity, a primary QoS flow indicator, or a synchronization group identifier, wherein the synchronization time granularity indicates a maximum transmission interval of synchronous transmission between different QoS flows in a synchronous transmission group, the primary QoS flow indicator indicates a primary QoS flow among the plurality of QoS flows, and the primary QoS flow is a reference QoS flow for transmission time interval (TTI) calculation in the synchronous transmission group.

15. The terminal device of claim 12, wherein a first QoS-flow group is mapped to a first data radio bearer (DRB), a second QoS-flow group is mapped to a second DRB, a time interval between a transmission resource for the first DRB and a transmission resource for the second DRB is less than or equal to a synchronization time granularity, and the first QoS-flow group and the second QoS-flow group each comprise at least one QoS flow.

16. The terminal device of claim 12, wherein the processor is further configured to:

adjust a transmission time of a first QoS flow to a first time, wherein a difference between the first time and a transmission time of a second QoS flow is less than or equal to a synchronization time granularity, and the first QoS flow and the second QoS flow are any two QoS flows among the plurality of QoS flows.

17. The terminal device of claim 12, wherein the plurality of QoS flows comprise a third QoS flow and a fourth QoS flow, the third QoS flow and the fourth QoS flow belong to a same synchronous transmission group, and the third QoS flow is a primary QoS flow; and the processor is configured to:

deliver a data packet of the third QoS flow to an upper layer subsequent to reception of the third QoS flow; and discard a data packet of the fourth QoS flow in response to an interval between a reception time of the fourth QoS flow and a reception time of the third QoS flow being greater than a synchronization time granularity.

18. The terminal device of claim 17, wherein the processor is further configured to:

deliver the third QoS flow and the fourth QoS flow to the upper layer subsequent to reception of the fourth QoS flow, in response to the interval between the reception time of the fourth QoS flow and the reception time of the third QoS flow being less than or equal to the synchronization time granularity.

* * * * *